United States Patent [19]

Ohmor et al.

[11] Patent Number: 4,667,000
[45] Date of Patent: May 19, 1987

[54] FLUORINE-CONTAINING COPOLYMER AND COMPOSITION CONTAINING THE SAME

[75] Inventors: Akira Ohmor, Ibaraki; Hiroshi Inukai, Settsu, both of Japan

[73] Assignee: Daikin Kogyo Co., Ltd., Osaka, Japan

[21] Appl. No.: 822,493

[22] Filed: Jan. 27, 1986

[30] Foreign Application Priority Data

Jan. 31, 1985 [JP] Japan .................................. 60-17562

[51] Int. Cl.$^4$ .............................................. C08F 14/22
[52] U.S. Cl. ................................. 526/247; 525/326.3; 526/249; 526/253; 526/254; 526/255
[58] Field of Search ............... 526/247, 249, 253, 254, 526/255; 525/326.3, 199, 200

[56] References Cited

U.S. PATENT DOCUMENTS

| | | | |
|---|---|---|---|
| 4,345,057 | 8/1982 | Yamabe et al. | 526/247 |
| 4,503,097 | 3/1985 | Higaki et al. | 526/247 |
| 4,529,785 | 7/1985 | Ohmori et al. | 526/247 |

*Primary Examiner*—Paul R. Michl
*Attorney, Agent, or Firm*—Armstrong, Nikaido, Marmelstein & Kubovcik

[57] ABSTRACT

A fluorine-containing copolymer comprising structural units of the formula (a):

$$-CH_2CF_2- \qquad (a)$$

structural units of the formula (b):

$$-CH_2-CH- \atop | \atop O-(CH_2)_{\overline{n}}OH \qquad (b)$$

wherein n is an integer of 1 to 10 and structural units of the formula (c):

$$-CFX-CFY- \qquad (c)$$

wherein X is —H, —Cl or —F and Y is —F, a lower fluoroalkyl group or a group having the formula:

$$-(OCF_2-CF)_{\overline{m}}-OC_3F_7 \atop | \atop CF_3$$

in which m is 0 or an integer of 1 to 3 and a curable composition comprising the fluorine-containing copolymer and a curing agent. The fluorine-containing copolymer is compatible with acrylic resins and is excellent in transparency, and the composition can be employed as a room temperature curing paints material.

5 Claims, No Drawings

FLUORINE-CONTAINING COPOLYMER AND COMPOSITION CONTAINING THE SAME

BACKGROUND OF THE INVENTION

The present invention relates to a fluorine-containing copolymer which has functional groups, and a curable composition containing the copolymer and a curing agent.

Conventionally, in room temperature curing fluoro-resin paints which do not require backing at high temperatures upon curing the paints, there has been employed a fluorine-containing copolymer prepared by copolymerizing a fluoroolefin, cyclohexyl vinyl ether, and the like as one component of the room temperature curing paints [Japanese Unexamined Patent Publication (Tokkyo Kokai Nos. 25414/1980, 34107/1982 and No. 34108/1982]. However, the conventional copolymers have the defect of being poor in compatibility with acrylic resins. The present inventors have found incorporation of acrylic resins into the room temperature curing fluoro-resin paint of the invention improves the weatherability, transparency and pigment dispersibility of the paints.

It is an object of the present invention to provide a novel fluorine-containing copolymer having a functional group, which has an excellent transparency and moreover has an excellent compatibility with an acrylic resin.

A further object of the present invention is to provide a curable composition containing the fluorine-containing copolymer and a curing agent.

These and other objects of the present invention will become apparent from the description hereinafter.

SUMMARY OF THE INVENTION

In accordance with the present invention, there is provided a fluorine-containing copolymer comprising structural units of the formula (a):

$$-CH_2CF_2- \qquad (a)$$

structural units of the formula (b):

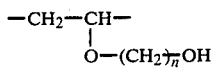
(b)

wherein n is an integer of 1 to 10 and structural units of the formula (c):

$$-CFX-CFY- \qquad (c)$$

wherein X is —H, —Cl or —F and Y is —F, a lower fluoroalkyl group or a group having the formula:

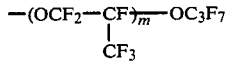

in which m is 0 or an integer of 1 to 3.

The present invention also provides a curable composition comprising a fluorine-containing copolymer having structural units of the formulas (a), (b) and (c) and a curing agent.

DETAILED DESCRIPTION

The fluorine-containing copolymers of the present invention usually have a number average molecular weight of 5,000 to 150,000, an intrinsic viscosity [η] of 0.15 to 1.50 in N-dimethylacetoamide at 35° C. and a glass transition temperature of −40° to 120° C.

In the present invention, the fluorine-containing copolymers contain 50 to 99% by mole of structural units of the formula (a), 0.1 to 30% by mole of structural units of the formula (b) and 1 to 50% by mole of structural units of the formula (c), preferably 65 to 90% by mole of structural units of the formula (a), 0.5 to 10% by mole of structural units of the formula (b) and 10 to 30% by mole of structural units of the formula (c).

When the content of the structural units (a) in the copolymers is from 50 to 99% by mole, the copolymers provide paint films having excellent chemical resistance, weatherability and stain resistance. When the content of the structural units (b) in the copolymers is from 0.1 to 30% by mole, the copolymers provide paints having an excellent curability. The structural unit (c) is effective in improving the solubility in solvents of the copolymers.

The fluorine-containing copolymers of the present invention are generally prepared by copolymerizing a monomer of the formula (a'):

$$CH_2=CF_2 \qquad (a')$$

a monomer of the formula (b'):

(b')

wherein n is an integer of 1 to 10 and a monomer of the formula (c'):

$$CFX=CFY \qquad (c')$$

wherein X is —H, —Cl or —F and Y is —F, a lower fluoroalkyl group having 1 to 5 carbon atoms or a group having the formula:

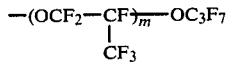

in which m is 0 or an integer of 1 to 3. When Y is a lower fluoroalkyl group, trifloromethyl group is preferable. Typical examples of the monomer of the formula (b') are, for instance,

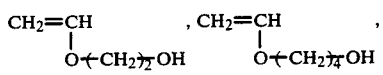

and the like. Typical examples of the monomer of the formula (c') are, for instance, $CFCl=CF_2$, $CF_2=CF_2$, and the like, and typical examples of the group having the formula:

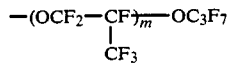

are, for instance,

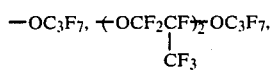

and the like. Other ethylenically unsaturated monomers may be further copolymerized with the above monomers so long as the physical properties of the copolymers of the present invention are not impaired. Typical examples of the other ethylenically unsaturated monomer are, for instance, an α-olefin such as ethylene or propylene, a vinyl ester such as vinyl acetate, and the like. When the monomer having the formula (c') is used in a large amount, the polymerization rate becomes rapid.

Emulsion polymerization, suspension polymerization and solution polymerization are applied to the preparation of the fluorine-containing copolymers of the present invention. In any of the above polymerization methods, the polymerization is usually carried out at a temperature of 0° to 150° C., preferably 5° to 95° C., and at a pressure of 1 to 50 kg/cm²G.

The polymerization mediums are, for instance, water for the emulsion polymerization; water, 1,1,2-trichloro-1,2,2-trifluoroethane, 1,2-dichloro-1,1,2,2-tetrafluoroethane, mixtures thereof, and the like for the suspension polymerization; and ethyl acetate, butyl acetate, mixtue thereof, and the like for the solution polymerization.

In the emulsion polymerization, there are used for instance, emulsifiers such as $C_7F_{15}COONH_4$, $H(CF_2)_8COONH_4$, $H(CF_2)_6COONH_4$, $C_7F_7COONa$ and $C_7F_{15}COONa$.

Known polymerization initiators can be employed in the present invention. For instance, redox initiators consisting of an oxidizing agent such as ammonium persulfate or potassium persulfate, a reducing agent such as sodium sulfite, and a transition metal salt such as ferrous sulfate are employed in the emulsion polymerization. Azo compounds and organic peroxide compounds are employed in the suspension and solution polymerizations, such as azobisisobutyronitrile, isobutyryl peroxide, octanoyl peroxide and di-isopropyl peroxydicarbonate.

In the emulsion polymerization and the suspension polymerization, it is preferable that the pH of the polymerization system is maintained within the range of 7 to 9 by adding a buffer such as sodium hydrogencarbonate, sodium carbonate or sodium phosphate to the system, because, in the course of the polymerization, the elimination of hydrogen fluoride from the monomers or the obtained copolymer may occur to lower the pH of the system, thus resulting in gellation of the prepared copolymer, and because the hydroxyalkyl vinyl ether (b') is easy to decompose under acidic condition.

The composition suitable for fabricating the room temperature curing paints containing the fluorine-containing copolymer of the present invention is prepared by admixing the above fluorine-containing copolymer with, as a curing agent, a compound having at least two groups capable of reacting with the functional group (hydroxyl group) of the fluorine-containing copolymer to crosslink the copolymer. Isocyanates and melamines are usually employed as the curing agent. Examples of the isocyanate are, for instance, hexamethylene diisocyanate, tolylene diisocyanate, hydrogenated tolylene diisocyanate, blocked diisocyanate thereof, and the like, but the isocyanates are not limited thereto. Examples of the melanine are, for instance, butylated melanine, methylated melanine, and the like, but the melanines are not limited thereto.

The curing agent is employed in an amount of 1 to 5 equivalents, preferably 1 to 1.5 equivalents based on the functional group (—OH group) in the fluorine-containing copolymer of the invention. The cross-linking reaction is usually carried out at room temperature to 200° C., preferably at room temperature to 100° C.

In case that the copolymers of the invention are used in room temperature curing fluoro-resin paints, preferably the paints include 1 to 95 parts by weight, especially 10 to 80 parts by weight of an acrylic resin per 100 parts by weight of the copolymer of the invention in order to raise the transparency and pigment dispersibility of the paints.

The acrylic resins used in the invention include homopolymers and copolymers of lower alkyl acrylate or methacrylate among the acrylic resins determined in this technical field (reference: "Encyclopaedia Chemica" 1, 42 to 43 (1960) published by Kyoritu Shuppan Kabushiki Kaisha).

Examples of the acrylic resins are, for instance, homopolymers and copolymers of a lower alkyl acrylate or methacrylate such as methyl methacrylate, ethyl methacrylate, butyl methacrylate or hydroxyethyl methacrylate; copolymers of the alkyl acrylate or methacrylate and other comonomers such as styrene and acrylonitrile; Hitaloid 3004, Hitaloid 3018 and Hitaloid 3046c which are commercially available from Hitachi Chemical Co., Ltd.; Acrydic A810-45, Acrydic A814 and Acrydic 47-540 which are commercially available from Dainippon Ink and Chemicals, Inc.; and the like. The acrylic resins used in the invention are, of course, not limited to these exemplified resins.

When the room temperature curing fluoro-resin paints are prepared from the fluorine-containing copolymer of the invention, the fluorine-containing copolymer is dissolved in the same kind of solvent as used in the solution polymerization in a solid concentration of 10 to 80% by weight, preferably 25 to 70% by weight.

Additives usually employed in the preparation of coating compositions may be employed, as occasion demands. The room temperature curing paints containing the copolymers of the invention can be applied as exterior and interior paints to metals, wood, concrete, plastics, etc. in the same manner as usual paints.

When a monomer capable of lowering the glass transition temperature is used in the preparation of the fluorine-containing copolymers of the present invention, the copolymers are also useful as fluorocarbonrubbers.

The present invention is more specifically described and explained by means of the following Examples, in which all parts are by weight. It is to be understood that the present invention is not limited to the Examples, and various changes and modifications may be made in the invention without departing from the spirit and scope thereof.

EXAMPLE 1

A 300 ml stainless autoclave was charged with 40 g of ethyl acetate, 3.2 g of hydroxybutyl vinyl ether (HBVE) and 0.5 g of di-isopropyl peroxydicarbonate. After degassing, 26 g of vinylidene fluoride (VdF) and 10 g of chlorotrifluoroethylene (CTFE) were added to the autoclave. The polymerization was carried out at 40° C. for 15 hours with stirring. The reaction mixture was added to petroleum ether, and the resulting precipitate was dried at 40° C. for 50 hours under reduced pressure to give 28 g of a fluorine-containing copolymer.

The copolymer had an intrinsic viscosity [η] of 0.20 in dimethyl acetoamide at 35° C. Also, differential thermogravimetry analysis (DTGA) of the copolymer showed a thermal decomposition starting temperature of 312° C. and differential scanning calorimetric (DSC) analysis of the copolymer showed a melting point of 75° C. and a crystallization temperature of 13° C.

The infrared absorption analysis showed an absorption based on —OH at 3350 cm$^{-1}$, and in $^1$H nuclear magnetic resonance ($^1$H NMR) analysis using tetramethylsilane as an internal standard, a signal based on HBVE was observed at δ=16 ppm (—OCH$_2$CH$_2$CH$_2$CH$_2$OH). Also, the elemental analysis was as follows:

Found (%): C 34.6, H 2.8, Cl 8.2, F 52.6

From the above results, it was confirmed that the obtained polymer was a copolymer of VdF, CTFE and HBVE in a moler ratio of 78.3:17.4:4.3.

EXAMPLE 2

A 4 l glass lining autoclave was charged with 1 l of 1.2-dichloro-1,1,2,2-tetrafluoroethane, 0.8 l of water, 2 g of NaHCO$_3$, 5 g of HBVE, 140 g of VdF and 10 g of CTFE, it was heated to 40° C. and 5 g of di-isopropyl peroxydicarbonate was then added to the autoclave. The polymerization was carried out for 10 hours, repeating the operation that a mixture of VdF, CTFE and HBVE in a molar ratio of 80:15:5 was supplied into the autoclave at every drop of the inner pressure of the autoclave to 8 kg/cm$^2$G to raise the pressure to 8.5 kg/cm$^2$G.

Thereafter, the reaction mixture was added to petroleum ether, and the resulting precipitate was dried at 80° C. for 30 hours under reduced pressure to give 100 g of a fluorine-containing copolymer.

The copolymer had [η] of 0.30 measured in the same condition as in Example 1. Also, DTGA of the copolymer showed a decomposition starting temperature of 312° C. and DSC analysis of the copolymer showed a glass transition temperature (Tg) of −15° C., a melting point of 78° C. and a crystallization temperature of 46° C.

The infrared absorption analysis showed an absorption based on —OH at 3350 cm$^{-1}$, and in $^1$H NMR analysis using tetramethylsilane as internal standard a signal based on HBVE was observed at δ=16 ppm (—OCH$_2$CH$_2$CH$_2$CH$_2$OH). Also, the elemental analysis was as follows:

Found (%): C 34.2, H 2.6, Cl 7.7, F 54.4

From the above results, it was confirmed that the obtained polymer was a copolymer of VdF, CTFE and HBVE in a moler ratio of 81.5:16:2.5.

EXAMPLE 3

In a mixed solvent of 40 parts of ethyl acetate and 30 parts of methyl ethyl ketone was dissolved 30 parts of the copolymer obtained in Example 1. To the resulting solution was added 3 parts of hexamethylene diisocyanate trimer (commercially available under the trade mark "Colonate EH" made by Nippon Polyurethane Kabushiki Kaisha), and the mixture was sufficiently admixed to give a curable composition.

Then, the composition was applied to an aluminum plate (BT-712 treatment, made by Nippon Test Panel Co., Ltd.) by brushing, and allowed to stand at room temperature for 7 days. The obtained film had a thickness of 25 μm. The film was confirmed to be cured, because the film was insoluble in ethyl acetate when rubbing with a tissue paper holding ethyl acetate.

The aluminum plate with the above film was subjected to a weathering test for 4,000 hours by using a Weather meter (made by Suga Shikenki Kabushiki Kaisha). A gloss retension was 95% (initial gloss: 63%).

EXAMPLE 4

A solution of 50 parts of acrylic resin of methyl methacrylate, ethyl methacylate and hydroxyethyl methacrylate in a molar ratio of 80:10:10 and 50 parts of ethyl acetate was added to an equal weight amount of a solution of 50 parts of the copolymer obtained in Example 2 and 50 parts of ethyl acetate. Then, 13 parts of hexamethylene diisocyanate trimer was added to the mixture. The mixture was sufficiently admixed to give a curable composition.

The composition was coated and cured in the same manner as in Example 3 to give a cured film. The obtained film was insoluble in ethyl acetate.

The weathering test for 3,000 hours by using a Weather meter was carried out. The gloss retension was 85% (initial gloss: 78%).

COMPARATIVE EXAMPLE 1

To a solution of 50 parts of a copolymer of chlorotrifluoroethylene, hydroxybutyl vinyl ether, cyclohexyl vinyl ether and n-butyl vinyl ether in a molar ratio of 50:10:25:10 and 50 parts of ethyl acetate was added to an equal weight amount of a solution of 50 parts of the same acrylic resin as used in Example 4 and 50 parts of ethyl acetate, and the mixture was sufficiently admixed.

The coating was carried out in the same manner as in Example 3. The obtained film caused whitening.

To the above mixture was added 16 parts of hexamethylene diisocyanate trimer to give a curable composition. The composition was coated and cured in the same manner as in Example 3. The obtained film caused whitening and had a gloss of 48%. The weathering test for 3,000 hours using a Weather meter was carried out. The gloss retention was 23%.

From the results of Examples 1 to 4 and Comparative Example 1, it is confirmed that the fluorine-containing copolymer of the present invention has a good compatibility with acrylic resins. Also, it is confirmed that the curable composition composed of the copolymer of the invention, an acrylic resin and a curing agent can be employed as a room temperature curing paint and the obtained film is excellent in weatherability, transparency, and the like.

What we claim is:

1. A fluorine-containing copolymer comprising 50–99 mole % of structural units of the formula (a):

$$-CH_2CF_2- \qquad (a)$$

0.1–30 mole % of hydroxyl-containing structural units of the formula (b):

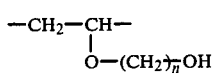

wherein n is an integer of 1 to 10 and 1–50 mole % of structural units of the formula (c):

—CFX—CFY— (c)

wherein X is —H, —Cl or —F and Y is —F, a lower fluoroalkyl group or a group having the formula:

$$-(OCF_2-CF)_{\overline{m}}-OC_3F_7$$
$$\phantom{-(OCF_2-}|\phantom{F)_{\overline{m}}-OC_3F_7}$$
$$\phantom{-(OCF_2-}CF_3$$

in which m is 0 or an integer of 1 to 3, wherein the intrinsic viscosity [η] of said fluorine-containing copolymer is 0.15-1.50 measured in N-dimethylacetoamide at 35° C., and the glass transition temperature of said copolymer is in the range −40° C. to 120° C.

2. The copolymer of claim 1, wherein said copolymer comprises 65 to 90% by mole of said structural units of the formula (a), 0.5 to 10% by mole of said structural units of the formula (b) and 10 to 30% by mole of said structural units of the formula (c).

3. A curable composition comprising a fluorine-containing copolymer and a curing agent; said fluorine-containing copolymer comprising 0.1–30 mole % of structural units of the formula (a):

—CH₂CF₂— (a)

0.1–30 mole % of hydroxyl-containing structural units of the formula (b):

$$-CH_2-CH-$$
$$\phantom{-CH_2-}|$$
$$\phantom{-CH_2-}O-(CH_2)_{\overline{n}}OH$$
(b)

wherein n is an integer of 1 to 10 and 1–50 mole % of structural units of the formula (c):

—CFX—CFY— (c)

wherein X is —H, —Cl or —F and Y is —F, a lower fluoroalkyl group or a group having the formula:

$$-(OCF_2-CF)_{\overline{m}}-OC_3F_7$$
$$\phantom{-(OCF_2-}|$$
$$\phantom{-(OCF_2-}CF_3$$

in which m is 0 or an integer of 1 to 3, wherein the intrinsic viscosity [η] of said fluorine-containing copolymer is 0.15-1.50 measured in N-dimethylacetoamide at 35° C., and the glass transition temperature of said copolymer is in the range −40° C. to 120° C.; and said curing agent being a compound having at least two groups capable of reacting with the hydroxyl group in the copolymer.

4. The composition of claim 3, wherein said curing agent is present in an amount of 1 to 5 equivalents based on the hydroxyl group of the copolymer.

5. The composition of claim 3, which further contains 1 to 95 parts by weight of an alkyl acrylate or methacrylate polymer.

* * * * *

UNITED STATES PATENT AND TRADEMARK OFFICE
CERTIFICATE OF CORRECTION

PATENT NO. : 4,667,000

DATED : May 19, 1987

INVENTOR(S) : Akira Ohmori et al.

It is certified that error appears in the above-identified patent and that said Letters Patent is hereby corrected as shown below:

On the title page Item [19], "Ohmor et al." should read -- Ohmori et al.

Item [75], "Akira Ohmor" should read -- Akira Ohmori --.

Signed and Sealed this

Tenth Day of November, 1987

Attest:

DONALD J. QUIGG

Attesting Officer

Commissioner of Patents and Trademarks